United States Patent [19]

Peters

[11] 3,830,973

[45] Aug. 20, 1974

[54] CATHODE RAY TUBE DISPLAY OF A MOTION PICTURE FILM

[75] Inventor: David L. Peters, Whitney Point, N.Y.

[73] Assignee: The Singer Company, Birmington, N.Y.

[22] Filed: Apr. 6, 1973

[21] Appl. No.: 348,497

Related U.S. Application Data

[63] Continuation-in-part of Ser. No. 174,111, Aug. 23, 1971, abandoned.

[52] U.S. Cl. .......................... 178/7.2, 178/DIG. 28

[51] Int. Cl. .......................... H04n 5/86

[58] Field of Search .......................... 178/DIG. 28

[56] References Cited

UNITED STATES PATENTS 2,922,841 1/1960 Graziano .......................... 178/DIG. 28

*Primary Examiner*—Robert L. Griffin

*Assistant Examiner*—George G. Stellar

*Attorney, Agent, or Firm*—James C. Kesterson; Leonard Weiss

[57] ABSTRACT

Frames of a motion picture film are transported at a desired frame rate through a scanning field where a light spot is deflected to trace a scanning raster on a scanned frame of the film. The vertical deflection of the light spot is in an opposite direction from the transportation direction of the film and is substantially proportional to the sum of the displacement of the scanned frame in the scanning field and a vertical sawtooth voltage; the horizontal deflection is in proportion to a horizontal sawtooth voltage. The sawtooth voltages and a video signal proportional to light emanating from the scanned frame are provided to a cathode ray tube where a viewing raster is traced by a beam on the face thereof whereby an image on the scanned frame is displayed. During a retrace time of the scanning raster, the light spot is deflected to an edge of a sprocket hole of the film associated with the scanned frame. The vertical component of the deflection to the edge is in proportion to the sum of displacement voltage corresponding to the displacement of the scanned frame, a vertical reference voltage and an error voltage. A signal having a known relationship to the error voltage is provided to vertically deflect the scanning raster to reduce the error voltage, thereby reducing an undesired shift of the scanning raster. In response to the displacement voltage corresponding to the scanned frame being about to pass from the scanning field, the displacement voltage is reset whereby the scanning raster is traced on a succeeding frame.

19 Claims, 8 Drawing Figures

PATENTED AUG 20 1974 3,830,973

SHEET 4 OF 6

PATENTED AUG 20 1974

3,830,973

SHEET 6 OF 6

CATHODE RAY TUBE DISPLAY OF A MOTION PICTURE FILM

CROSS-REFERENCES TO RELATED APPLICATIONS

This is a continuation-in-part of the application having Ser. No. 174,111 filed on Aug. 23, 1971, now abandoned.

BACKGROUND OF THE INVENTION

1. Field of the Invention

This invention relates to the display of the frames of a motion picture film, and more particularly to apparatus for providing on a viewing surface a display of frames which are transported at any desired frame rate.

2. Description of the Prior Art

In a flight simulator, the simulation of the view from an aircraft may be provided by apparatus which comprises an image bearing medium, such as a motion picture film taken from an actual aircraft while in flight. In a display of the motion picture film, the film may be transported at a frame rate related to the simulated speed of the aircraft.

A cathode ray tube, (CRT) because of its low cost and flexibility, is most often used for providing displays in a simulated aircraft. Typically, the beam of the CRT is deflected across the face thereof to trace a multiplicity of evenly spaced horizontal lines from the left side to the right side of the face. After a line is traced, the beam is rapidly deflected from the right side to the left side of the face at a slightly lower vertical location whereby a succeeding line may be traced. The rapid left to right deflection is provided during a horizontal retrace time and referred to as a horizontal retrace. During a horizontal retrace time, the CRT is biased below cutoff (referred to as horizontal blanking) whereby the trace of the beam is prevented from appearing on the face. After the bottom line is traced, the beam is rapidly deflected to the upper left hand corner of the CRT where a succeeding horizontal line may be traced across the top of the face. The rapid deflection from the lower right to the upper left corner of the face is provided during a vertical retrace time and referred to as a vertical retrace. During the vertical retrace time, the CRT is biased below cutoff (referred to as vertical blanking) whereby the trace of the beam is prevented from appearing on the face.

The array of horizontal lines referred to ereinbefore is known in the art as a raster. Typically, the lines of a complete raster are traced 60 times per second in response to horizontal and vertical sync pulses provided by a sync generator. In providing an image on the face of the CRT, selected portions of selected raster lines are brightened to a desired intensity in response to a video signal.

It should be understood that a motion picture film is typically transported at a frame rate of 24 frames per second. Images on the film may be displayed on a CRT by optically scanning the film with a light spot in synchronism with the tracing of the lines of the raster and providing a video signal in accordance with the intensity of light emanating from the film. Because of the difference of the frame rate from the raster rate, the light spot traces rasters on two frames of the film while five rasters are traced on the face of the CRT. However, in the flight simulator, because the film is transported at a frame rate related to the speed of the aircraft, typical apparatus for a CRT display of a film is inapplicable in simulating the view from an aircraft.

Heretofore, the display of a motion picture film which is transported at any desired speed has been provided by apparatus which is costly, complex and unreliable.

SUMMARY OF THE INVENTION

The principal object of the present invention is to provide on a viewing surface a display of the frames of an image bearing medium which is transported at a desired frame rate through an image scanning apparatus.

According to the present invention, frames of an image bearing medium are trasported through a scanning field of an optical scanner at a desired frame rate, said frames having reference locations respectively provided thereon; a light spot of said optical scanner traces a scanning raster upon a scanned frame of said medium in response to horizontal and vertical scanner deflection signals, a component of said vertical scanner deflection signal being in proportion to a displacement signal which is proportional to the integral of said desired frame rate; during a retrace time said light spot is deflected to said reference location of said scanned frame, the deflection thereto being in proportion to the sum of said displacement signal and an error signal, said error signal being representative of an undesired shift of said scanning raster; in response to said error signal, said light spot is vertically deflected in proportion to an error deflection signal having a known relationship to said error signal, said error deflection signal causing a deflection tending to reduce said error signal; in response to said scanned frame being about to pass from said scanning field, said displacement signal is changed during a frame search time to deflect said light spot upon said reference location of a succeeding frame.

The present invention provides apparatus for deflecting the light spot of an optical scanner to provide a scanning raster for scanning frames of a motion picture film transported at a desired frame rate through a scanning field of the scanner. The scanning raster is shifted in accordance with the integral of the frame rate of the film. When a scanned frame is about to pass from the scanning field, the light spot may be deflected during a retrace of the scanning raster to scan a succeeding frame whereby each scanning raster scans an entire frame.

An error signal is provided which is representative of an undesired shift of the scanning raster. The scanning raster is deflected to reduce the error signal and thereby reduce the undesired shift.

Other objects, features and advantages of the present invention will become more apparent in light of the following detailed description of a preferred embodiment thereof as illustrated in the accompanying drawing.

DESCRIPTION OF THE PREFERRED EMBODIMENT

In the present invention, displayed on a viewing surface are images of frames of an image bearing medium, such as a motion picture film, which are trasported at any desired frame rate through a scanning field of a flying spot scanner. A frame of the medium within the scanning field is scanned by a light spot of the flying spot scanner which traces a scanning raster. The scanning raster is shifted in accordance with a displacement voltage which corresponds to the displacement of the scanned frame within the scanning field. The shift thereby compenstates for the transportation of the scanned frame through the scanning field.

It should be understood that the number of tracings of the scanning raster on the scanned frame is proportional to the time that the scanned frame is in the scanning field. Accordingly, the scanned frame may have thereon a multiplicity of tracings of the scanning raster.

The preferred embodiment of the present invention includes a raster computer which has three modes of operation respectively referred to as a frame search mode, a tracking mode and a TV search mode. The raster computer is in the frame search mode in response to a portion of the scanned frame being about to pass from the scanning field. In the frame search mode the displacement voltage is changed to correspond to the displacement of a succeeding frame during a vertical retrace (by the light spot) after the scanning raster is traced. Simultaneously with the changing of the displacement voltage, the light spot is deflected to scan the succeeding frame.

The raster computer is in the tracking mode when lines of the scanning raster are traced by the light spot. The scanning raster is shifted in accordance with the displacement voltage as described hereinbefore. The frame search and tracking modes are the subject matter of a U.S. Pat. No. 3,778,546 and assigned to The Singer Company.

In the preferred embodiment, the raster computer is in the TV search mode during vertical retrace times of the scanning raster. In the TV search mode the raster computer generates an error voltage which is proportional to any undesired shift of the scanning raster (due to thermally-induced component changes, for example). An error deflection voltage proportional to the integral of the error voltage is provided as a component of the displacement voltage thereby reducing the undesired shift.

Figure 1:
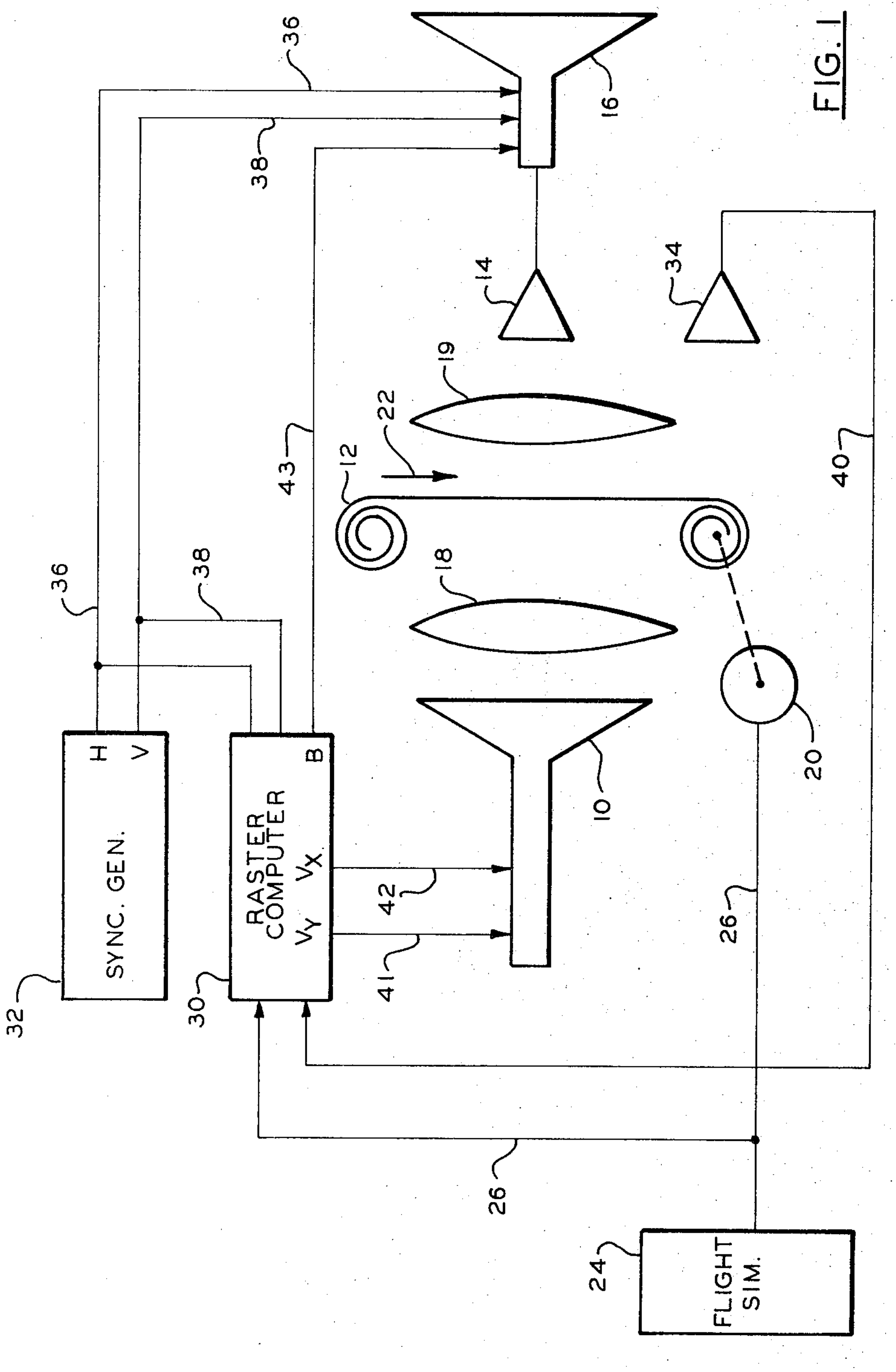
FIG. 1 is a block diagram of the preferred embodiment of the present invention.

Referring now to FIG. 1, a flying spot scanner 10 provides a spot of light which is directed through a frame of a motion picture film 12 which is in a scanning field of the scanner 10. Light emanating from the scanned frame is received by the optical input of a photomultiplier tube 14 which has an output connected to the video input of a display 16. A video signal proportional to the intensity of the received light is provided by the photomultiplier tube 14 to the video input of the display 16. A lens 18 is disposed to focus the light spot upon the film 12 and a lens 19 is disposed to focus the light emanating from the film 12 upon the input of the photomultiplier tube 14.

A servo drive unit 20 transports the film 12 in a transportation direction indicated by an arrow 22 thereby successively transporting the frames of the film 12 into the scanning field. A drive voltage proportional to the desired frame rate of the film 12 is provided to the drive unit 20 by a flight simulator 24 through a signal line 26. In response to the drive voltage, the film 12 is transported at the desired frame rate. In this embodiment the lines of the scanning raster are traced in a direction perpendicular to the transportation direction of the film and the time for a frame to traverse the scanning field is always less than the time for the light spot to traverse the portion of the frame from the first to the last lines of the scanning raster. The flight simulator 24 is additionally connected through the line 26 to a raster computer 30 for providing the drive voltage thereto.

A pair of inputs of the raster computer 30 are connected to a sync generator 32 through signal lines 36, 38, respectively. The sync generator 32 provides horizontal and vertical sync pulses described hereinafter.

An input of the raster computer 30 is connected to an indexing photomultiplier 34, similar to the photomultiplier 14 through a signal line 40. The photomultiplier 34 is disposed to receive light from a sprocket hole of the film 12, the sprocket hole being associated with the scanned frame. In response to receiving the light through the sprocket hole, the photomultiplier 34 provides a sprocket signal to the raster computer 30.

In response to the drive voltage, the horizontal and vertical sync pulses and the sprocket signals, the raster computer 30 provides a vertical scanner deflection voltage and a horizontal scanner deflection voltage to the scanner 10 through the signal lines 41–42, respectively, and blanking pulses to the display 16 through a signal line 43. The scanner deflection voltages deflect the light spot to trace the scanning raster and the blanking pulses blank the display 16 during horizontal and vertical retrace times. In the preferred embodiment, the horizontal and vertical retrace times of the scanning raster are substantially the same as corresponding retrace times of the viewing raster.

Connected to the display 16 are the lines 36, 38 whereby horizontal and vertical sync signals are provided for the generation of a viewing raster traced by a beam on the face of a CRT.

In a tracing of the scanning raster, the first line is traced horizontally along the bottom of the scanned frame (the portion of the frame that first leaves the scanning field); successive lines are traced along successively higher portions (opposite the direction of the arrow 22) of the scanned frame. Since the speed of the vertical deflection of the light spot is greater than the frame rate, when the light spot starts to trace a scanning raster the entire raster is traced on the scanned frame.

Figure 2:
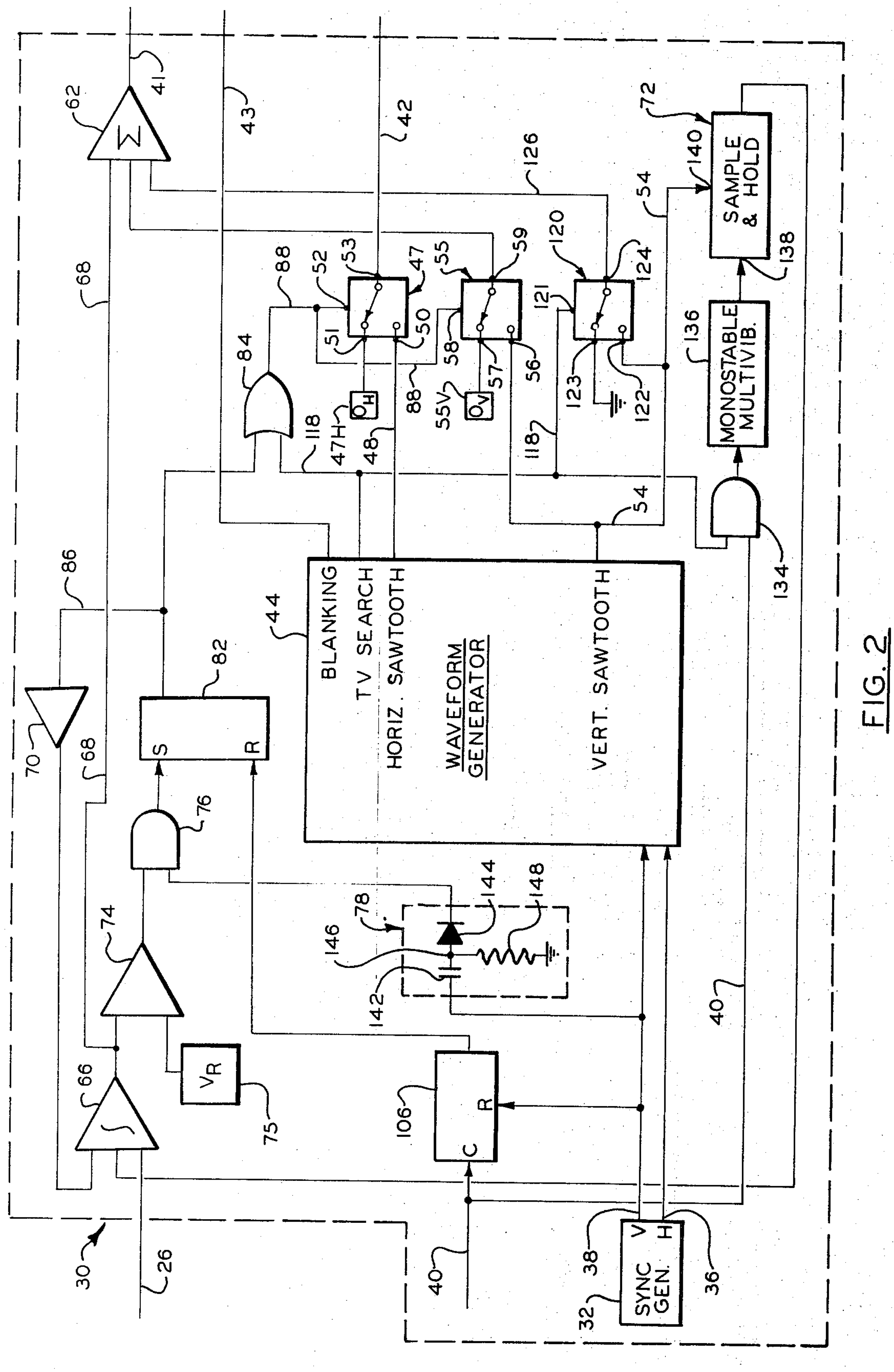
FIG. 2 is a schematic block diagram of a raster computer which may be used in the embodiment of FIG. 1.
Figure 3:
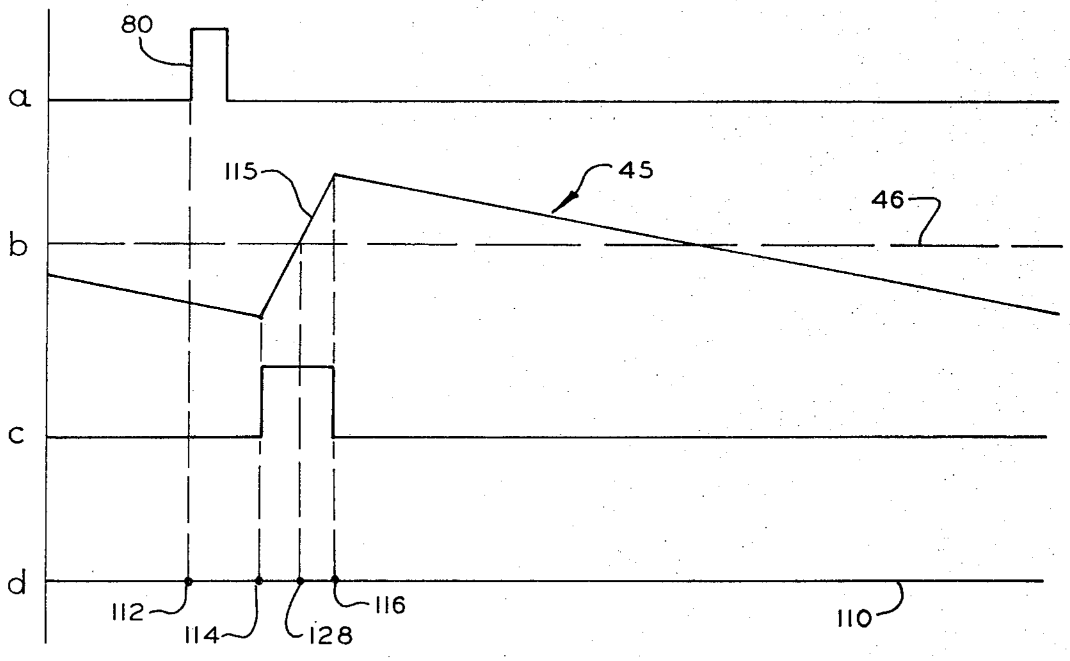
FIG. 3 is an illustration of waveforms associated with the vertical scanner deflection voltage provided by the raster computer of FIG. 2.
Figure 4:
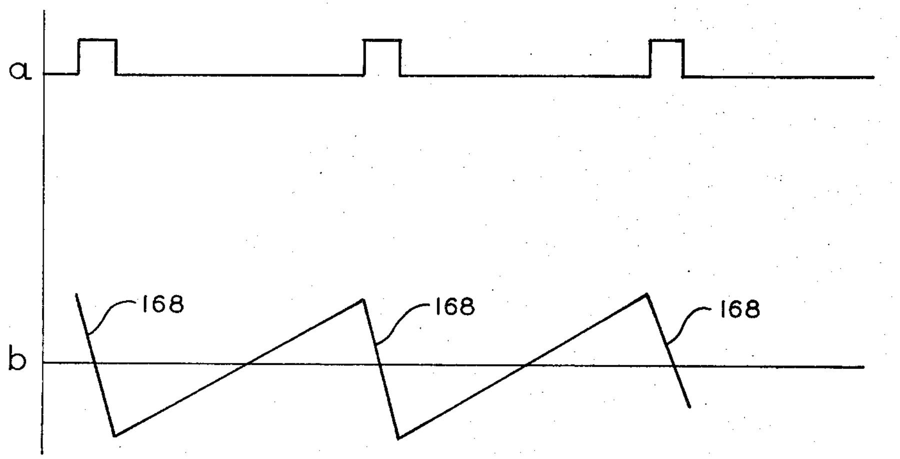
FIG. 4 is an illustration of waveforms associated with the horizontal scanner deflection voltage provided by the raster computer of FIG. 2.

Referring now to FIGS. 2–4, included in the raster computer 30 is a sync generator 43 which provides the horizontal and vertical sync pulses to a waveform generator 44 via the lines 36, 38, respectively. In response to the sync pulses, the waveform generator 44 provides horizontal and vertical sawtooth voltages respectively proportional to corresponding CRT deflection voltages which deflect the beam of the CRT thereby generating a viewing raster.

Referring now to illustrations *a* and *b*, FIG. 3, the vertical sawtooth voltage is represented by a vertical sawtooth waveform 45 which is symmetrical about a zero voltage ordinate 46. The vertical sawtooth voltage has associated therewith the vertical sync pulses represented by the waveform of illustration *a*, FIG. 3. Illustrations *a* and *b*, FIG. 4 are illustrative of the waveforms of the horiziontal sync pulse and the horizontal sawtooth voltage, respectively.

The horizontal sawtooth voltage is provided through a signal line 48 to a first analog switch 47 at a first data input terminal 50 thereof. The switch 47 has a second data input terminal 51 connected to a horizontal reference voltage source 47H ($O_H$). An output terminal 53 of the switch 47 is connected to the signal line 42 whereby the horizontal scanner deflection voltage is provided to the scanner 10.

In response to a DC voltage of approximately 3 volts (referred to as ONE hereinafter) being applied to a logic input terminal 52 of the switch 47, provided at the output terminal 53 is an output voltage substantially equal to the voltage provided to the terminal 50. In response to substantially ground potential (referred to as ZERO hereinafter) being applied to the logic terminal 52, provided at the output terminal 53 is an output voltage substantially equal to the voltage provided to the terminal 51. The switch 47 may be of a type comprised of field effect transistors or any other suitable type.

In a similar manner, the vertical sawtooth voltage is provided through a signal line 54 to a second analog switch 55 (similar to the switch 47) at a first data input terminal 56 thereof. The switch 55 has a second data input terminal 57 connected to a vertical reference voltage source 55V ($0_v$). An output terminal 59 of the switch 55 is connected to a summing amplifier 62 at an input thereof. The vertical sawtooth and vertical reference voltages are provided at the terminal 59 in response to ONE and ZERO, respectively, being provided to a logic input terminal 58 of the switch 55.

As explained hereinafter, in the tracking mode, ONE is provided to the terminals 52, 58 whereby the horizontal and vertical sawtooth voltages are provided to the scanner 10 and the amplifier 62, respectively; in the search mode ZERO is provided to the terminals 52, 58 whereby the horizontal and vertical reference voltages are provided to the scanner 10 and the amplifier 62, respectively.

The output of the amplifier 62 is connected to the scanner 10 through the line 41. The amplifier 62 is of a well known type which provides an output voltage substantially proportional to the sum of voltages respectively provided to the inputs thereof. As explained hereinafter, all of the components of the vertical scanner deflection voltage are provided to inputs of the amplifier 62 whereby the vertical scanner deflection voltage is provided at the output thereof.

An input of the amplifier 62 is connected to the output of the integrator 66 through a signal line 68. The integrator 66 is of a type which provides a voltage proportional to the time integral of the sum of input voltages applied to the inputs thereof. The integrator 66 may be of the type comprised of an operational amplifier or any other suitable type.

The integrator 66 has three inputs which are respectively connected to the drive unit 24, the output of a reset amplifier 70 and the output of a sample and hold network 72. As explained hereinafter, in the tracking mode the amplifier 70 provides zero volts and the sample and hold network 72 provides the error voltage referred to hereinbefore. Accordingly, in the tracking mode the integrator 66 provides a displacement voltage which is the sum of a frame displacement voltage and an error deflection voltage respectively proportional to time integrals of the drive voltage and the error voltage. Since the integral of a rate is a displacement, the integral of the frame rate is representative of the displacement of the scanned frame within the scanning field. Undesired shifts of the scanning raster due to component changes are reduced by the error deflection voltage in a manner described hereinafter.

In the present invention, the error deflection voltage has a polarity which shifts the scanning raster in a direction which tends to reduce the error voltage thereby shifting the scanning raster to reduce the undesired shift thereof. In the preferred embodiment, the scanning raster is shifted to reduce the average value of the error voltage to zero volts because the time integral of a non-zero average value increases to an infinitely large value. Hence, the displacement voltage is proportional to the displacement of a scanned frame within the scanning field and the scanning raster is precisely shifted in accordance with the frame rate. This aspect of the invention is in accordance with the well known infinite gain characteristic of integrators.

The output of the integrator 66 is connected to one of two inputs of a comparator 74, the other input being connected to a reference displacement voltage source 75 ($V_R$). The reference displacement voltage ($V_R$) is equal to a displacement voltage representative of the scanned frame being about to leave the scanning field. In response to the displacement voltage being less than the reference displacement voltage ($V_R$), the comparator 74 provides ZERO; ONE is provided in response to the displacement voltage being greater than or equal to the reference displacement voltage ($V_R$). The comparator 74 may be of the type comprised of an operational amplifier or any other suitable type.

The output of the comparator 74 is connected to one of the two inputs of an AND gate 76, the other input being connected to the sync generator 32 via a transmission gate 78 and the line 38. The transmission gate 78, which is described hereinafter, is a well known circuit for providing a positive going edge of a pulse applied to the input thereof. Accordingly, the vertical sync pulse waveform has an edge 80 (illustration *a*, FIG. 3) which is representative of the positive going edge provided through the transmission gate 78. In the preferred embodiment, the vertical pulse has an amplitude of ONE (ZERO is provided on the line 38 in the absence of the vertical sync pulse). Therefore, a positive going edge represented by the edge 80 causes the provision of ONE through the transmission gate 78 to the AND gate 76.

As is well known to those skilled in the art, an AND gate provides ONE in concurrent response to ONEs being provided to the inputs thereof. Accordingly, in concurrent response to a scanned frame being about to leave the scanning field and a positive going edge being provided through the transmission gate 78, the AND gate 76 provides ONE whereby the frame search mode is initiated in the raster computer 30.

The output of the AND gate 76 is connected to a flip-flop 82 at a set input thereof. The flip-flop 32 is a well known latching type which provides ONE at an output thereof in response to ONE being provided to the set input; ZERO is provided at the output in response to ONE being provided to a reset input of the flip-flop 82. The output of the flip-flop 82 remains unchanged in response to ZERO being concurrently provided to the set and reset inputs. Therefore, in response to the initiation of the frame search mode (ZERO is provided to the reset input, as explained hereinafter) the flip-flop 82 provides ONE. As explained hereinafter when the raster computer 30 is in the frame search mode, the flip-flop 82 continuously provides ONE.

The output of the flip-flop 82 is connected to an input of the reset amplifier 70 and an input of a NOR gate 84 through a signal line 86. The output of the NOR gate 84 is connected to the terminals 52, 58 through a signal line 88. As is known to those skilled in the art, in response to ONE being applied to an input of a NOR gate, ZERO is provided at the output thereof. Therefore, ZERO is provided by the NOR gate 84 in the frame search mode.

Accordingly, in response to the raster computer 30 being in the frame search mode, the horizontal and vertical reference voltages are provided through the switches 47, 55, respectively, as described hereinbefore.

ONE provided by the flip-flop 82 additionally causes the reset amplifier 70 to provide a reset voltage of an amplitude and polarity which causes the displacement voltage to decrease; in response to ZERO, the amplifier 70 provides zero volts. Because the integrator 66 provides a voltage proportional to the time integral of the sum of the input voltages applied to the inputs thereof, immediately after the flip-flop 82 provides ONE, the displacement voltage is unchanged.

Figure 5:
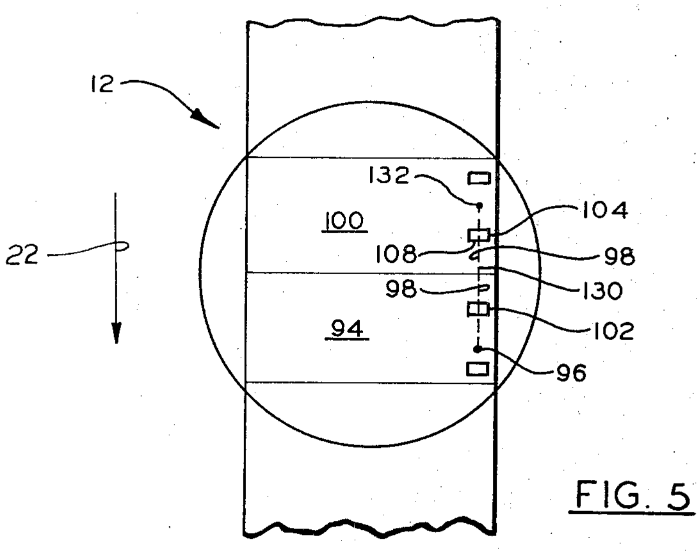
FIG. 5 is a front elevation of a scanned frame and a succeeding frame of a film in the scanning field.

Referring now to FIG. 5, in an immediate response to the flip-flop 82 providing ONE, the horizontal and vertical reference voltages and the displacement voltage cause the provision of scanner deflection voltages which deflect the light spot on a scanned frame 94 of the film 12 to a point 96. The point 96 is in alignment with sprocket holes associated with the frames of the film 12.

After the flip-flop 82 provides ONE, the displacement voltage decreases below the reference displacement voltage thereby causing the comparator 74 to provide ZERO whereby the AND gate 76 provides ZERO to the flip-flop 82.

The decrease of the displacement voltage causes the amplifier 62 to provide a vertical frame search scanner deflection voltage whereby the light spot is deflected along a broken line 98 over portions of the scanned frame 94 and a succeeding frame 100. The line 98 intersects sprocket holes 102, 104 of the frames 94, 100, respectively. Therefore, the vertical frame search scanner deflection voltage causes the light spot to pass through the spocket holes 102, 104.

In response to the light spot passing through the sprocket holes 102, 104, the photomultiplier 34 (FIG. 1) respectively provides first and second sprocket signals to a counter 106 at a count input thereof through the line 40. In this embodiment a sprocket signal is ONE provided on the line 40; ZERO is provided in the absence of a sprocket signal.

In response to the second sprocket signal, the counter 106 provides ONE at an output thereof. It should be understood that the counter 106 provides ONE when the light spot is deflected over an edge 108 of the sprocket hole 104. In this embodiment, the edge 108 has a known location with respect to the frame 100. Accordingly, when the light spot is deflected over the edge 108, the displacement voltage corresponds to the displacement within the scanning field of the frame 100 whereby the frame 100 becomes the scanned frame.

The output of the counter 106 is connected to the reset input of the flip-flop 82 whereby ZERO is provided at the output of the flip-flop 82 in response to the light spot over the edge 108 (the AND gate 76 provides ZERO to the set input).

A reset input of the counter 106 is connected to the line 38 whereby prior to a sprocket signal being provided to the count input, a vertical sync pulse resets the counter 106 whereby the counter 106 provides ZERO and is conditioned to provide ONE in response to a pair of sprocket signals.

Referring now to illustration *d*, FIG. 3, on a time axis 110, a point 112 is representative of the beginning of a frame search time, the termination thereof being represented by a point 114. The frame search time is when the frame search mode may be provided whereby a succeeding frame becomes a scanned frame and the integrator 66 is reset as described hereinbefore. The termination is simultaneous with the start of a retrace portion of the vertical sawtooth voltage (referred to as a vertical retrace voltage hereinafter) represented by a portion 115 (illustration *b*, FIG. 3) of the waveform 45; the time of the termination of the vertical retrace voltage is represented by a point 116.

Referring now to illustrations *c* and *d*, FIG. 3, from the time represented by the point 114 to the time represented by the point 116 the waveform generator 44 (FIG. 2) provides ONE to an input of the NOR gate 84 through a signal line 118 whereby the raster computer 30 is in the TV search mode. ONE on the line 118 is referred to hereinafter as a TV search pulse (illustration *c*, FIG. 3). In response to the TV search pulse, the NOR gate 84 provides ZERO to the terminals 52, 58 whereby the horizontal and vertical reference voltages are respectively provided as described hereinbefore.

The TV search pulse is provided through th line 118 to a third analog switch 120 (similar to the switch 47) at a logic input terminal 121 thereof. The switch 120 has first and second data input terminals 122, 128 respectively connected to the waveform generator 44 through the line 54 and ground. An output terminal 124 of the switch 120 is connected to an input of the amplifier 62 through a signal line 126. Therefore, in response to a TV search pulse, the switch 120 provides the vertical retrace voltage (illustration *b*, FIG. 3) to the amplifier 62, ground being provided thereto in the absence of a TV search pulse. In response to the vertical retrace voltage, the amplifier 62 provides a vertical TV search scanner deflection voltage.

Since the waveform 45 is symmetrical about the zero ordinate 46, the retrace portion 115 is correspondingly symmetrical. Therefore, the vertical retrace voltage has one polarity from the beginning of a frame search time (the point 112) to a time represented by a point 128 midway between the points 114, 116 (the point 128 represents a time when vertical retrace voltage is zero volts) and an opposite polarity from the time represented by the point 128 to the time represented by the point 116.

Referring now to FIG. 5, at the beginning of a TV search pulse the scanner deflection voltages deflect the light spot to a point 130. During the time that the TV search pulse is provided, the light spot is deflected along the line 98 through the sprocket hole 104 to a point 132 (deflection to the point 132 being provided at the termination of the TV search pulse).

It should be understood that in the absence of an undesired shift of the scanning raster, the light spot is deflected over the edge 108 at the time represented by the point 128. The deflection is over the edge 108 because the horizontal scanner deflection voltage is substantially the same in both search modes, but in the TV search mode the displacement voltage is a component of the vertical TV search scanner deflection voltage which compensates for the transportation of the frame 100 through the scanning field. In the preferred embodiment, the error voltage equals the vertical retrace voltage at the time when the light spot is deflected over the edge 108.

Apparatus for providing the error voltage is comprised of an AND gate 134 (similar to the AND gate 76 referred to hereinbefore) which has a pair of inputs respectively connected to the lines 40, 118. Therefore, the AND gate 134 provides ONE in concurrent response to a sprocket signal and the TV search pulse.

The output of the AND gate 134 is connected to the input of a monostable multivibrator 136 which provides ZERO until the input thereof is changed from ZERO to ONE. In response to ONE being provided at the input thereof, the output of the multivibrator 136 is changed to ONE for a short duration thereby providing a multivibrator pulse. Accordingly, the multivibrator pulse provides an indication of the time when the light spot is deflected over the edge 108.

The output of the multivibrator 136 is connected to a gating input 138 of the sample and hold network 72, a sampling input 140 thereof being connected to the line 54. In response to ONE being applied for a short duration at the input 138 (referred to as a gating signal) the sample and hold network 72 provides a held output voltage equal to a sampling voltage at the sampling input 140. The held output voltage is maintained by the sample and hold network 72 until a successive gating signal is provided. Accordingly, the held output voltage is equal to vertical retrace voltage at the time of the occurrence of the multivibrator pulse (the light spot being deflected over the edge 108). Therefore, the held output voltage is the error voltage referred to hereinbefore.

The transmission gate 78 is comprised of a capacitor 142, one side thereof being connected to the line 38 and the other side being connected to the anode of a diode 144 thereby forming a junction 146. The cathode of the diode 144 is connected to the AND gate 76 and the junction 146 is connected through a resistor 148 to ground.

In the absence of a signal on the line 38, the resistor 148 maintains the junction 146 at substantially ground potential. In response to a negative going voltage on the line 38, a negative voltage is provided to the junction 146 because a change of the voltage on the line 38 is transmitted through the capacitor 142. The diode 144 inhibits the transmission therethrough of the negative voltage to the AND gate 76.

In response to a positive-going voltage on the line 38, a positive voltage is provided at the junction 146. The positive voltage is transmitted through the diode 144 to the AND gate 76. Therefore, the transmission gate 78 transmits the positive going edge of the vertical sync pulse to the AND gate 76.

Figure 6:
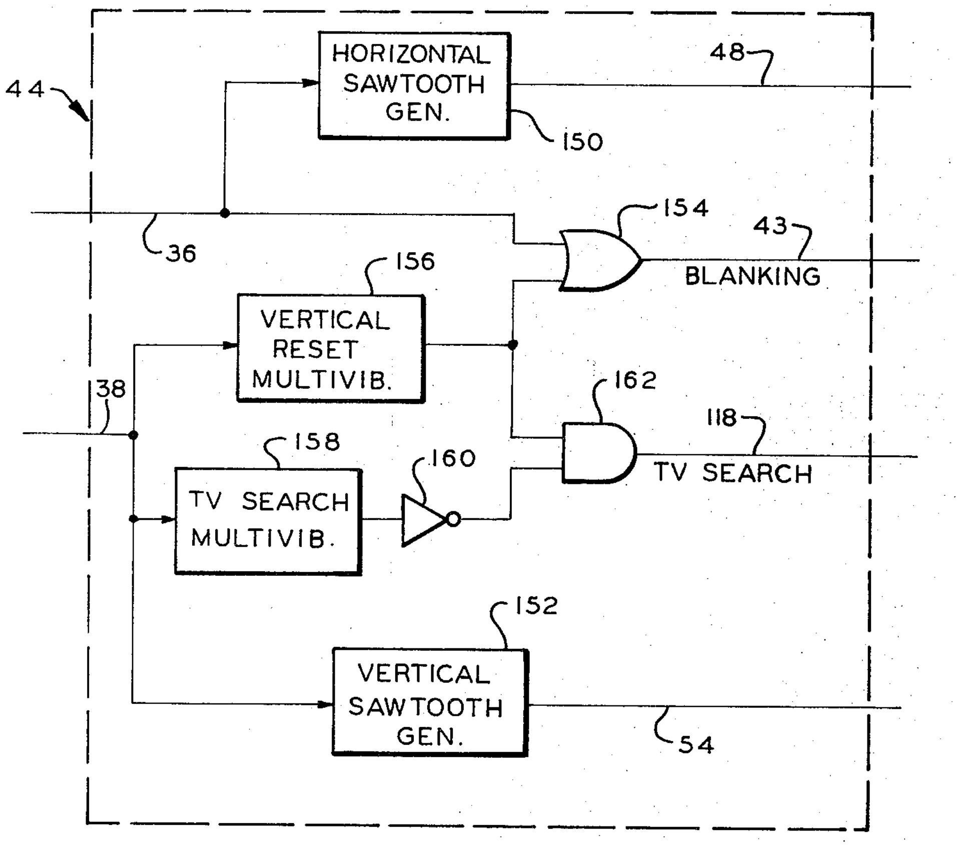
FIG. 6 is a schematic block diagram of the waveform generator of FIG. 2.

Referring now to FIGS. 2, 3 and 6, the waveform generator 44 is comprised of horizontal and vertical sawtooth generators 150, 152 having inputs respectively connected to the lines 36, 38. The outputs of the sawtooth generator 150, 152 are respectively connected to the lines 48, 54. In response to the horizontal and vertical sync pulses, the sawtooth generators respectively provide the horizontal and vertical sawtooth voltages referred to hereinbefore (illustrations *a* and *b*, FIG. 3 and illustrations *a* and *b*, FIG. 4).

The blanking pulses are provided by an OR gate 154 which has one of two inputs connected to the line 36, the other input being connected to the output of a vertical reset monostable multivibrator 156. An OR gate is a well-known circuit for providing ONE in response to ONE being provided to an input thereof. Therefore, the OR gate 154 provides ONE in response to a horizontal sync pulse.

In the preferred embodiment, a horizontal sync pulse occurs during a horizontal retrace of a line of the scanning raster. Therefore, the OR gate 154 provides a blanking pulse during the horizontal retrace times of the scanning raster.

The multivibrator 156 is connected to the line 38 whereby vertical sync pulses are provided to the input thereof. The multivibrator 156 provides ZERO until the input thereof is changed from ZERO to ONE. In response to a vertical sync pulse, the output of the multivibrator 156 provides ONE for a duration equal to the vertical retrace time of the scanning raster. Therefore, in response to a vertical sync pulse, the multivibrator 156 provides ONE from a time represented by the point 112 (illustration *d*, FIG. 3) to a time represented by the point 116.

In providing the TV search pulse, a TV search monostable multivibrator 158 is connected to the line 38. The multivibrator 158 provides ZERO until the input thereof is changed from ZERO to ONE which causes the output of the multivibrator 158 to provide ONE for a duration equal to the frame search time. Therefore, in response to a vertical sync pulse, the multivibrator 158 provides ONE from a time represented by the point 112 to a time represented by the point 114.

The output of the multivibrator 158 is connected to the input of an inverter 160 which provides an inversion of an applied input signal (ZERO and ONE are respectively provided at the output of the inverter 160 in response to ONE and ZERO being provided at the input thereof). The output of the inverter 160 is connected to one of two inputs of an AND gate 162, the other input being connected to the output of the multivibrator 156. The AND gate 162 is similar to the AND gate 76 referred to hereinbefore. Therefore, in response to a vertical sync pulse, ONEs are concurrently provided to the AND gate 162 during the time represented by the point 114 to the point 116 thereby providing the TV search pulse.

Figure 7:
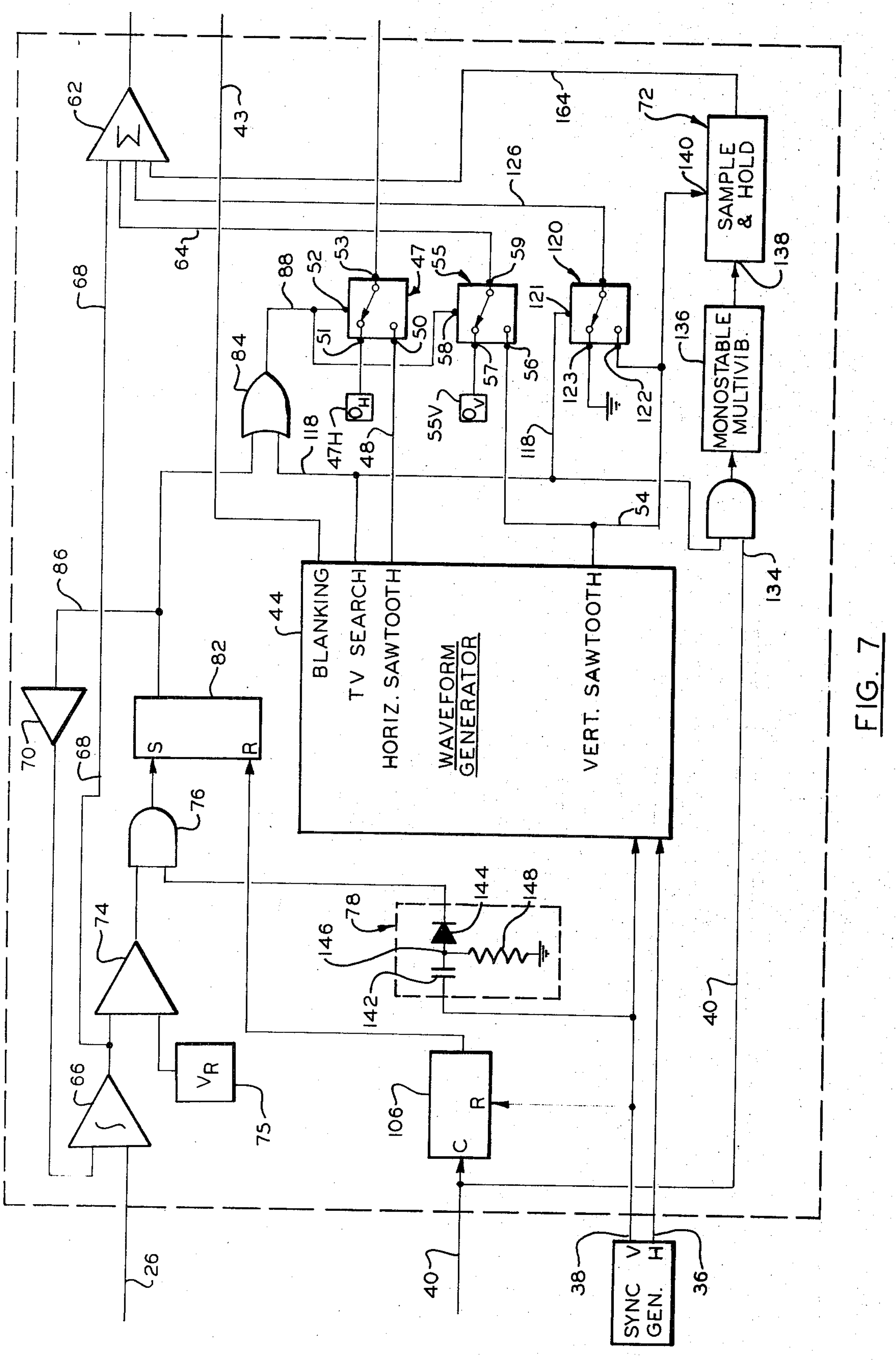
FIG. 7 is a schematic block diagram of a first alternative raster computer which may be used in the embodiment of FIG. 1.

Referring now to FIG. 7, in a first alternative raster computer the output of the sample and hold network 72 is connected to an input of the amplifier 62 through a signal line 164. Accordingly, an error deflection voltage, equal to the error voltage, is provided to the amplifier 62. The error deflection voltage causes a deflection of the scanning raster in a direction tending to decrease the error voltage and thereby tending to decrease an unwanted shift of the scanning raster.

Figure 8:
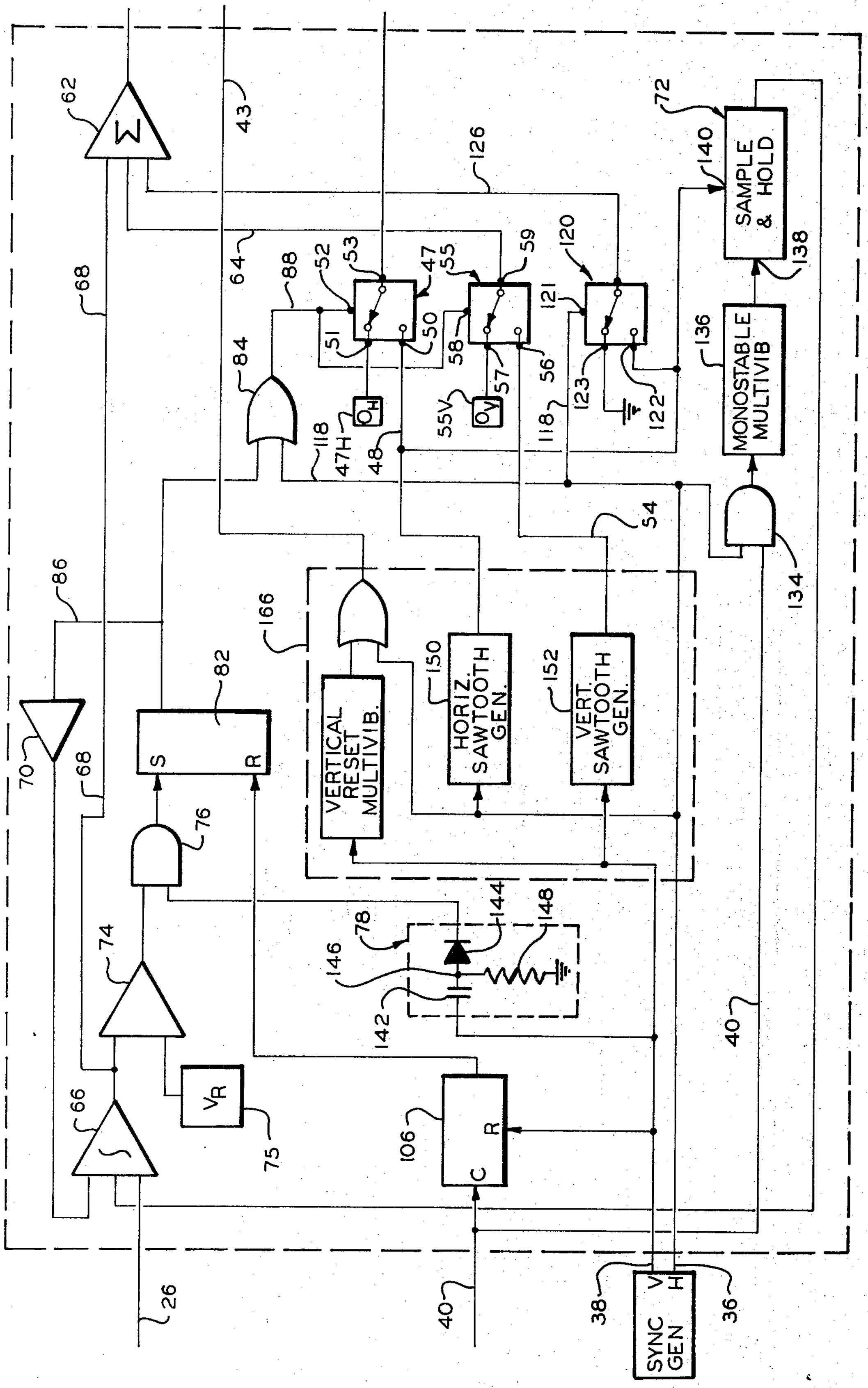
FIG. 8 is a schematic block diagram of a second alternative raster computer which may be used in the embodiment of FIG. 1.

Referring now to FIG. 8, in a second alternative raster computer a waveform generator 166 provides horizontal blanking pulses on the line 118 whereby the horizontal and vertical reference voltages are provided through the switches 47, 55, respectively, during the respective horizontal retrace times of the scanning raster. The terminals 122, 140 are connected to the waveform generator 166 through the signal line 48 whereby the horizontal sawtooth voltage is provided through the switch 120 in response to a horizontal blanking pulse. Accordingly, a retrace portion of the horizontal sawtooth voltage represented by a portion 168 of the waveform of illustration a, FIG. 4 is provided to the amplifier 62. Therefore, the second alternative raster computer is in the TV search mode during the horizontal retrace times of the scanning raster.

It should be understood that in alternative embodiments, a single photomultiplier in conjunction with suitable filters may be used to provide the sprocket and video signals.

Thus, there has been shown hereinbefore a system for displaying the frames of an image bearing medium upon a viewing surface.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by letters patent of the United States is:

1. In an improved method of displaying image of respective frames of an image bearing medium where an image is in accordance with the opacity of said medium, said frames being transported at a desired frame rate through a scanning field of an optical scanner where a light spot is directed upon a receiving side of a scanned frame, a video signal having a value proportional to light emanating from a transmission side thereof being provided to a display where a beam traces a viewing raster on a viewing surface, including the steps of:

generating a displacement signal having a value substantially proportional to the time integral of said frame rate;

deflecting said light spot vertically in proportion to the sum of the vertical deflection of said display beam and the value of said displacement signal and horizontally in proportion to the horizontal deflection of said display beam, whereby a scanning raster is traced by said light spot;

comparing said displacement reference signal having a value representative of the displacement of a scanned frame which is about to pass from the scanning field;

changing said displacement signal to a value corresponding to the displacement of the succeeding frame to be scanned by said light spot in response to the value of said displacement signal being at least equal to the value of said displacement reference signal;

the improvement comprising:

providing respective reference locations on said frames;

providing a source of error signals;

deflecting said light spot to the reference location of said scanned frame, the deflection thereto being in proportion to the sum of the value of said displacement signal, and the value of an error signal, the value of said error signal being representative of an undesired shift in said scanning raster;

providing an error deflection signal with a value thereof having a known relationship to the value of said error signal; and vertically deflecting in said light spot in proportion to the value of said error deflection signal in a direction tending to cause a reduction of the undesired shift in said scanning raster.

2. The method of claim 1 wherein the value of said error deflection signal is proportional to the integral of the value of said error signal and said medium is transported in response to a drive signal having a value proportional to said desired frame rate.

3. The method of claim 2 wherein said displacement signal is proportional to the sum of the value of said error deflection signal and the time integral of the value of said drive signal.

4. The method of claim 1 wherein said light spot is deflected to said reference location during a vertical retrace time of said scanning raster.

5. The method of claim 1 wherein said light spot is deflected to said reference location during a horizontal retrace time of said scanning raster.

6. An improved apparatus for displaying images of respective frames on an image bearing medium where an image is in accordance with the opacity of said medium, said frames having respective reference locations provided thereon, said medium being transported by a drive unit at a desired frame rate through a scanning field of an optical scanner which provides a light spot to the receiving side of a scanned frame within said scanning field, the image of said scanned frame being displayed on a display of the type where a beam traces a viewing raster on a viewing surface, the apparatus being of the type having;

means connected to said display and disposed to receive light emanating from a transmission side of said scanned frame, said means providing to said display a video signal representative of the intensity of said emanating light;

integrator means having a first input connected for response to the value of a drive signal provided by said drive unit for provididng a displacement signal having a value substantially proportional to the time integral of said frame rate;

a displacement reference signal source for providing a reference signal having a value representative of the displacement of a scanned frame which is about to pass from the scanning field;

comparison means connected to said integrator means and said displacement reference signal source for providing a comparison signal indicative of the value of said displacement signal being at least equal to the value of said displacement reference signal;

resetting means connected to said comparison means and said integrator means for resetting said integrator means to change the value of said displacement signal to correspond to the displacement of a succeeding frame in said scanning field in response to said comparison signal, whereby said succeeding frame becomes said scanned frame;

generating means for providing horizontal and vertical sawtooth signals having amplitudes respectively proportional to the horizontal and vertical displacement of said display beam on said viewing surface; and deflection means connected to said integrator means, said generating means and said scanner for vertically and horizontally deflecting said light spot to trace a scanning raster in concurrent response to said sawtooth signals and said displacement signal, said light spot being vertically deflected in proportion to the sum of the value of said displacement signal and the vertical deflection of said display beam and horizontally deflected in proportion to the horizontal deflection of said display beam;

the improvement comprising:

TV search means connected to said deflection means, said integrator means and said generating means for causing a TV search deflection of said light spot to the reference location of said scanned frame during a retrace time of said scanning raster, said TV search deflection being in proportion to the sum of the values of said displacement and a sawtooth voltage concurrent with said TV search deflection, the value of said concurrent sawtooth voltage being in error signal representative of an undesired shift in said scanning raster, said error signal being provided to a second input of said integrator means whereby said displacement signal is proportional to the time integral of the sum of the values of said drive signal and said error signal.

7. Apparatus according to claim 6 wherein said TV search means comprises means responsive to said generating means for providing said TV search deflection during a vertical retrace of said scanning raster.

8. Apparatus according to claim 7 wherein said medium is a motion picture film and the reference location of said scanned frame is a sprocket hole, said TV search means comprising:

photomultiplier means displaced to receive light from said sprocket hole and provide a sprocket signal in response thereto; and means connected to said photomultiplier means for providing said error signal in concurrent response to said vertical sawtooth voltage and said sprocket signal.

9. Apparatus according to claim 8 additionally comprising means for storing said error signal.

10. Apparatus according to claim 6 wherein said TV search means comprises means responsive to said generating means for providing said TV search deflection during a horizontal retrace of said scanning raster.

11. Apparatus according to claim 10 wherein said medium is a motion picture film and the reference location of said scanned frame is a sprocket hole, said TV search means comprising:

photomultiplier means disposed to receive light from a sprocket hole of said film and provide a sprocket signal in response thereto; and means connected to said photomultiplier means for providing said error signal in concurrent response to said horizontal sawtooth voltage and said sprocket signal.

12. Apparatus according to claim 11 additionally comprising means for storing said error signal.

13. An improved apparatus for displaying images of respective frames on an image bearing medium where an image is in accordance with the opacity of said medium, said frames having respective reference locations provided thereon, said medium being transported by a drive unit at a desired frame rate through a scanning field of an optical scanner which provides a light spot to the receiving side of a scanned frame within said scanning field, the image of said scanned frame being displayed on a display of the type where the beam traces a viewing raster on a viewing surface, the apparatus being of the type having;

means connected to said display and disposed to receive light emanating from a transmission side of said scanned frame, said means providing to said display a video signal representative of the intensity of said emanating light;

integrator means connected for response to the value of a drive signal provided by said drive unit for providing a displacement signal having a value substantially proportional to the time integral of said frame rate;

a displacement reference signal source for providing a reference signal having a value representative of the displacement of a scanned frame which is about to pass from the scanning field;

comparison means connected to said integrator means and said displacement reference signal source for providing a comparision signal indicative of the value of said displacement signal being at least equal to the value of said displacement reference signal;

resetting means connected to said comparison means and said integrator means for resetting said integrator means to change the value of said displacement signal to correspond to the displacement of a succeeding frame in said scanning field in response to said comparison signal, whereby said succeeding frame becomes said scanned frame;

generating means for providing horizontal and vertical sawtooth signals having amplitudes respectively proportional to the horizontal and vertical displacement of said display beam on said viewing surface; and deflection means connected to said integrator means, said generating means and said scanner for vertically and horizontally deflecting said light spot to trace a scanning raster in concurrent response to said sawtooth signals and said displacement signal, said light spot being vertically deflected in proportion to the sum of the value of said displacement signal and the vertical deflection of said display beam and horizontally deflected in proportion to the horizontal deflection of said display beam;

the improvement comprising:

TV search means connected to said deflection means, said integrator means and said generating means for causing a TV search deflection of said light spot to the reference location of said scanned frame during a retrace time of said scanning raster, said TV search deflection being in proportion to the sum of the values of said displacement and a sawtooth voltage concurrent with said TV search deflection, the value of said concurrent sawtooth voltage being an error signal representative of an undesired shift in said scanning raster, said error signal being provided to said deflection means to cause a proportional vertical deflection of said light spot, said vertical deflection being in a direction tending to reduce said error signal.

14. Apparatus according to claim 13 wherein said TV search means comprises means responsive to said generating means for providing said TV search deflection during a vertical retrace of said scanning raster.

15. Apparatus according to claim 14 wherein said medium is a motion picture film and the reference location of said scanned frame is a sprocket hole, said TV search means comprising:

photomultiplier means displaced to receive light from said sprocket hole and provide a sprocket signal in response thereto; and means connected to said photomultiplier means for providing said error signal in concurrent response to said vertical sawtooth voltage and said sprocket signal.

16. Apparatus according to claim 15 additionally comprising means for storing said error signal.

17. Apparatus according to claim 13 wherein said TV search means comprises means responsive to said generating means for providing said TV search deflection during a horizontal retrace of said scanning raster.

18. Apparatus according to claim 17 wherein said medium is a motion picture film and the reference location of said scanned frame is a sprocket hole, said TV search means comprising:

photomultiplier means disposed to receive light from a sprocket hole of said film and provide a sprocket signal in response thereto;

means connected to said photomultiplier means for providing said error signal in concurrent response to said horizontal sawtooth voltage and said sprocket signal.

19. Apparatus according to claim 18 additionally comprising means for storing said error signal.

* * * * *

UNITED STATES PATENT OFFICE

CERTIFICATE OF CORRECTION

Patent No. 3,830,973 Dated August 20, 1974

Inventor(s) David L. Peters

It is certified that error appears in the above-identified patent and that said Letters Patent are hereby corrected as shown below:

Column 1, line 50, "ereinbefore" should be --hereinbefore--.

Column 2, line 15, "trasported" should be --transported--.

Column 3, line 21, "trasported" should be --transported--.

Column 7, line 67, "spocket" should be --sprocket--.

Column 8, line 54, "th" should be --the--.

Column 8, line 57, "128" should be --123--.

Column 11, line 66, after "displacement" insert --signal with a displacement--.

Signed and sealed this 7th day of January 1975.

(SEAL)
Attest:

McCOY M. GIBSON JR.
Attesting Officer

C. MARSHALL DANN
Commissioner of Patents